(12) United States Patent
Walters

(10) Patent No.: US 6,279,248 B1
(45) Date of Patent: Aug. 28, 2001

(54) DIGITAL MEASURING SYSTEM HAVING A MULTI-ROW ENCODER DISK

(75) Inventor: Gary W. Walters, Escondido, CA (US)

(73) Assignee: Central Purchasing, Inc., Camarillo, CA (US)

( * ) Notice: Subject to any disclaimer, the term of this patent is extended or adjusted under 35 U.S.C. 154(b) by 0 days.

(21) Appl. No.: 09/401,620

(22) Filed: Sep. 22, 1999

(51) Int. Cl.[7] .................................. G01B 3/20; G01B 5/02

(52) U.S. Cl. .............................................. 33/784; 33/1 PT

(58) Field of Search .......................... 33/1 N, 1 PT, 33/783, 784, 792, 793, 794, 795, 762, 763, 773, 818, 819, 820; 250/231.14

(56) References Cited

U.S. PATENT DOCUMENTS

| | | |
|---|---|---|
| 443,869 | 12/1890 | Riglander . |
| 2,034,804 | 3/1936 | Gamroth . |
| 4,008,523 | 2/1977 | Von Voros . |
| 4,034,477 | 7/1977 | Von Voros . |
| 4,035,922 | 7/1977 | Von Voros . |
| 4,077,129 * | 3/1978 | Nishikata ................................ 33/784 |
| 4,229,883 | 10/1980 | Kobashi . |
| 4,255,861 | 3/1981 | Nakata et al. . |
| 4,375,722 | 3/1983 | Nishikata et al. . |
| 4,420,887 * | 12/1983 | Sakata et al. ........................... 33/794 |
| 4,435,904 * | 3/1984 | Logan et al. ............................ 33/784 |
| 4,448,531 | 5/1984 | Seigo . |
| 4,459,749 | 7/1984 | Reider et al. . |
| 4,466,189 * | 8/1984 | Tobin, Jr. ................................ 33/1 PT |
| 4,499,374 | 2/1985 | Kabaya . |
| 4,521,112 | 6/1985 | Kuwabara et al. . |
| 4,521,113 | 6/1985 | Kuwabara et al. . |
| 4,536,963 | 8/1985 | Yamamoto et al. . |
| 4,578,868 | 4/1986 | Sasaki et al. . |
| 4,593,473 | 6/1986 | Shimomura . |
| 4,612,658 * | 9/1986 | Suzuki et al. ........................... 33/784 |
| 4,636,630 | 1/1987 | Nagai . |
| 4,648,718 | 3/1987 | Sadamitsu et al. . |
| 4,684,257 | 8/1987 | Hanaoka et al. . |
| 4,711,034 | 12/1987 | Koizumi . |
| 4,717,824 | 1/1988 | Sakamoto et al. . |
| 4,748,861 | 6/1988 | Matsumoto et al. . |
| 4,840,488 | 6/1989 | Kabaya et al. . |
| 4,912,322 | 3/1990 | Ichikawa . |
| 4,965,446 * | 10/1990 | Vyse ............................... 250/231.14 |
| 4,983,825 | 1/1991 | Ichikawa et al. . |
| 4,991,125 | 2/1991 | Ichikawa . |
| 5,003,171 * | 3/1991 | Paley .............................. 250/231.14 |
| 5,022,162 * | 6/1991 | Luikko ................................... 33/784 |
| 5,026,164 | 6/1991 | Ichikawa . |
| 5,027,526 | 7/1991 | Crane . |
| 5,035,507 | 7/1991 | Nishioka et al. . |

(List continued on next page.)

Primary Examiner—Diego Gutierrez
Assistant Examiner—Madeline Gonzalez
(74) Attorney, Agent, or Firm—Michaelson & Wallace

(57) ABSTRACT

The present invention is embodied in a hand held caliper with a hand movable slide, whose motion is transformed into rotation of an apertured multi-row encoder disk, a radiation source and a radiation detector. The present invention accurately measures a linear dimension using a simple, efficient, and durable digital measuring system. Accuracy of 0.0001" is attained, greater than the 0.0005" of the prior art, without encountering greater manufacturing costs, by utilizing well known fabrication techniques when producing the multi-row encoder disk, and otherwise using well known and inexpensive technology. The present invention does not require a motion dampening device, as errors may be determined and signal jitter are compensated for in the invention electronically or through the use of software, which adds little or no additional cost to the system and does not add mechanical complexity. Further, the present invention only requires a single rotatable disk to determine the direction of rotation, and no phase offset circuitry, through the use of dual rows of light emitting slots in the disk, the slots being offset between rows by 90° (in quadrature), but may be offset by as little as 10°.

4 Claims, 11 Drawing Sheets

U.S. PATENT DOCUMENTS

| | | |
|---|---|---|
| 5,057,686 | 10/1991 | Hikawa et al. . |
| 5,067,816 | 11/1991 | Ichikawa . |
| 5,142,793 * | 9/1992 | Crane ..................................... 33/763 |
| 5,155,355 | 10/1992 | Kabaya . |
| 5,183,055 * | 2/1993 | Seager ................................... 33/792 |
| 5,198,663 | 3/1993 | Ichikawa et al. . |
| 5,204,524 | 4/1993 | Ichikawa et al. . |
| 5,208,767 * | 5/1993 | George-Kelso et al. .............. 33/763 |
| 5,225,830 | 7/1993 | Andermo et al. . |
| 5,253,431 * | 10/1993 | Smith ..................................... 33/784 |
| 5,337,488 * | 8/1994 | Lemelson ............................... 33/784 |
| 5,430,954 | 7/1995 | Best et al. . |
| 5,477,621 * | 12/1995 | Koizumi et al. ....................... 33/784 |
| 5,479,010 | 12/1995 | Shimomura et al. . |
| 5,483,751 * | 1/1996 | Kodato .................................. 33/794 |
| 5,485,468 | 1/1996 | Kiriyama et al. . |
| 5,495,677 * | 3/1996 | Tachikake et al. .................... 33/784 |
| 5,574,381 | 11/1996 | Andermo et al. . |
| 5,604,345 | 2/1997 | Matsura . |
| 5,774,219 | 6/1998 | Matsura . |
| 5,841,133 | 11/1998 | Omi . |
| 5,901,458 * | 5/1999 | Andermo et al. ...................... 33/784 |
| 5,920,198 * | 7/1999 | Suzuki et al. .......................... 33/784 |
| 6,145,207 * | 11/2000 | Brunson ................................. 33/784 |

* cited by examiner

| CLOCKWISE ROTATION OF DISK |||
|---|---|---|
| PREVIOUS STATE | EXPECTED CURRENT STATES | ERROR STATES |
| A | A,B | D,C |
| B | B,C | A,D |
| C | C,D | A,B |
| D | A,D | B,C |

FIG. 13

| COUNTER-CLOCKWISE ROTATION OF DISK |||
|---|---|---|
| PREVIOUS STATE | EXPECTED CURRENT STATES | ERROR STATES |
| A | A,D | B,C |
| B | B,C | C,D |
| C | C,B | A,D |
| D | D,C | A,B |

FIG. 14

DIGITAL MEASURING SYSTEM HAVING A MULTI-ROW ENCODER DISK

TECHNICAL FIELD

The present invention relates to digital linear measuring systems and more particularly to devices which measure a linear dimension using conversion of rotational motion to linear motion.

BACKGROUND OF THE INVENTION

Calipers are used to measure linear dimensions in various portable or hand held uses. Distances measured may be on the order of 0.001" or smaller. This order of resolution gives rise to difficulty in practical representation to a human operator. Traditionally, a "Vernier" type caliper used a gear reduction system which translated rotational motion of a gear to be represented as a linear distance displayed on a mechanical dial. However, such systems have inherent problems such as slop in the gears ("backlash")and limitations in accuracy of the machining of parts for calipers measuring dimensions less than 0.001". Although these limitations can be overcome through the use of anti-backlash devices and modern machining methods, these add cost, complexity and frailty.

More recently, calipers have incorporated optical sensing systems which use a sensor to detect radiation from a source, and use a signal generated by an optical sensor to generate an analog electrical signal. Currently, calipers using optical sensing systems are accurate to 0.0005". These devices (U.S. Pat. Nos. 4,008,523 and 4,684,257) typically use a glass plate in the shape of a rectangular strip, etched with lines that inhibit the passage of light or depositing a layer of light absorbing material in which lines of the absorbing material have been etched away.

Other calipers utilizing optical sensors (U.S. Pat. Nos. 4,034,477, 4,035,922 and 5,430,954) use a disk with a single row of etched lines which rotationally pass between a photocell that emits a light and an optical sensor, but otherwise operate similarly to the glass strip above. The rotational movement of the disk causes a continuous signal to be generated by the sensor relative to the amount of light it receives.

One problem with such a device is that if a user measures a dimension that is, say 0.001", the sensor moves, or the glass strip/wheel moves, 0.001", typically from one etch point to the next. This limits the accuracy the caliper because of the limitations imposed by costs of manufacturing. Typically, the accuracy of the prior art is no greater than 0.0005".

Because of the 1:1 measuring mentioned above, calipers require a dampening system to inhibit rapid movement of the measuring jaws. The 1:1 measuring requires the CPU to sample the sensor-generated signal at a sufficient rate to accurately detect when the signal reaches a level signifying a valid increment/decrement of a measuring count. If the user moves the jaws of the calipers too rapidly, the CPU sampling rate may not be high enough to detect when a signal level crosses a threshold. This may result in missed counts, producing erroneous output to the user. This result manifests itself when signal threshold crossings are too close in time, such that more than one signal threshold crossing occurs in a single sampling time of the CPU. A motion dampening device is typically employed to restrict the speed of movement of the measuring jaws to comply with the CPU sampling rate. These devices are well known in the art. The addition of the dampening device adds cost and mechanical complexity to the measuring device, and thus it is desirable to remove the need for dampening, as well as increasing the sampling rate.

An additional disadvantage of calipers which utilize a disk is that only a single row of slots are used. In order to determine the direction of rotation of the disk (which is also indicative of the direction of travel of the jaws of the calipers), two light signals must be sensed through the same slot. This is carried out with at least one photocell and two sensors. Once the signals are sensed, one of the signals must be offset by 90°. This offset is done through a phase offset circuit, adding additional cost and complexity to the measuring device. In an alternative embodiment, prior art calipers utilizing a disk system require the use of two disks in order to determine direction of travel. This method also gives rise to additional cost and complexity. It would be desirable to use a single disk without additional phase offset circuitry and still be able to easily determine direction of rotation of the disk.

Another disadvantage of prior art calipers incorporating optical sensing systems is that each measuring device must be built as a single unit. The physical measuring jaws, the body of the entire device, and the optical sensing systems must be built as a whole. This precludes modularity between devices, restricting the use of the optical sensing system to a single caliper. It would be desirable to have a modular optical sensing system usable by a number of calipers or which can be retrofitted onto a mechanical caliper, as this would cut costs for these types of tools. Additionally, this would allow for ease of learning when the same display and modes of operation would be applicable to a range of different calipers, instead of a single device.

Further, prior art calipers which utilize optical sensing systems typically do not detect errors. An error can manifest itself when the signal input rate exceeds the CPU sampling rate, due to manufacturing defects in the etching of the glass strip or the wheel, resulting in varying etch widths. The prior art calipers use dampening systems to avoid exceeding the CPU sampling rate, but cannot compensate for defects in the etching process. Errors may also arise when the CPU sampling rate is exceeded, as discussed above. It would be desirable to incorporate an error detection system so that a motion dampening system would not be necessary and so that etch defects could be known to the system and compensated for, without a significant increase in manufacturing costs.

One problem with prior art calipers is signal jitter. Signal jitter is an effect seen when the user is not moving the jaws of the calipers. Due to vibrations, which may come from a variety of sources, a signal from a sensor oscillates about a point. This effect causes significant problems when the point at which the jitter occurs is at, or close to, a signal threshold. If a jittering signal crosses a signal threshold, the CPU may interpret each threshold crossing to be actual movement of the glass strip, or rotational movement of the wheel, and thus generate increment/decrement pulses. Prior art systems utilize motion dampening systems, as well as other mechanical devices, to overcome the effects of signal jitter, but these additional components increase cost and complexity of the measuring device, and may not be completely effective. It would be desirable to remove the need for motion dampening systems, or other mechanical components to compensate for signal jitter, while at the same time removing any adverse effects of signal jitter upon the measuring device, without adding mechanical complexity or cost to the device.

SUMMARY OF THE INVENTION

To overcome the limitations in the prior art as described above and other limitations that will become apparent upon reading and understanding the present specification, the present invention is embodied in a hand held caliper with a hand movable slide, whose motion is transformed into rotation of an apertured multi-row encoder disk, a radiation source and a radiation detector. The present invention accurately measures a linear dimension using a simple, efficient, and durable digital measuring system. Accuracy of 0.0001" is attained, greater than the 0.0005" of the prior art, without encountering greater manufacturing costs, by utilizing well known fabrication techniques when producing the multi-row encoder disk, and otherwise using well known and inexpensive technology. The present invention does not require a motion dampening device, as errors may be determined and signal jitter are compensated for in the invention electronically or through the use of software, which adds little or no additional cost to the system and does not add mechanical complexity. Further, the present invention only requires a single rotatable disk to determine the direction of rotation, and no phase offset circuitry, through the use of dual rows of light emitting slots in the disk, the slots being offset between rows by 90° (in quadrature), but may be offset by as little as 10°.

The present invention can be designed to be modular. A single unit can replace older mechanical and electrical measuring systems on calipers. In order to further remove the need of a motion dampening device typically required in a caliper, the present invention includes apparatus which detects errors in the CPU samples as well as compensates for consistently detected errors, such as those that would occur in a defective etch slot on the encoder disk.

The present invention is embodied in a system and a method for measuring a linear dimension using a multi-row encoder disk. The present invention transforms the linear dimension into a rotational displacement of an encoder disk. By determining the displacement of the encoder disk the linear dimension can be accurately determined. Rotational displacement is determined using the encoder disk, a radiation source and a radiation detector. The encoder disk includes at least two concentric encoder rows having a multiple equally-spaced slots. These slots are apertures in the encoder disk. The openings in one row are offset from the openings in the other row by a certain amount to aid in determining the direction of the encoder disk and allow for greater resolution and accuracy.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

FIG. 13 shows a table corresponding to expected states in FIG. 12, when the encoder disk is moving in a clockwise direction.

FIG. 14 shows a table corresponding to expected states in FIG. 12 when the encoder disk is moving in a counter-clockwise direction.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

As shown in FIGS. 2–6 for the purposes of illustration, the invention is embodied in a system and a method for measuring a linear or rotational magnitude using a multi-row encoder disk. The invention uses an encoder disk with multiple concentric rows, a radiation source on one side of the disk over some of the openings and a radiation sensor opposite the source on the other side of the disk. Each row contains a plurality of alternating openings and closures. As the encoder disk turns the radiation source emits radiation through some of the openings where the radiation is detected by the sensor.

When the radiation is detected by the sensor, the sensor emits a signal to a signal processor in the form of a continuous pseudo-sinusoid corresponding with the strengths of detected radiation. The signal processor uses this signal to determine direction of rotation of the disk, increment/decrement a counter and detect errors.

II. Structural Overview

Figure 1:
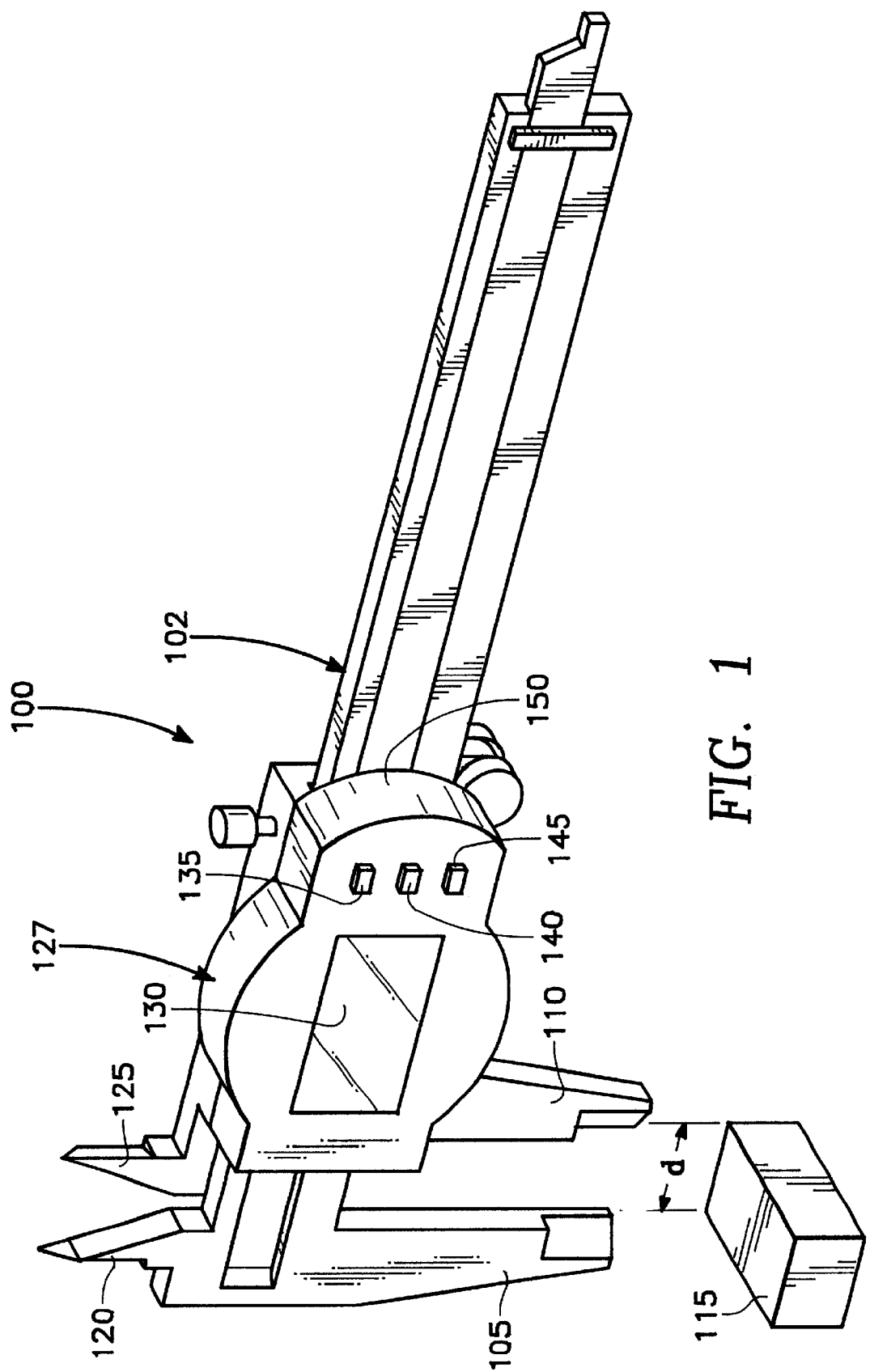
FIG. 1 illustrates a digital measuring system of the present invention incorporated into a digital caliper.

FIG. 1 illustrates a digital measuring system of the present invention incorporated into a digital caliper. Although calipers are preferred, the present invention may be incorporated into several other types of portable measuring devices such as, for example, micrometers or height gauges, which require linear measurement as part of their operation. In general, the digital caliper 100 includes a main body 102 that includes a first jaw 105 and a second jaw 110 in a sliding relationship with each other that are used to measure an outside dimension (d) of an object to be measured 115. The first jaw 105 and second jaw 110 are capable of being moved toward each other (closed) and away from each other (opened) over a certain distance to ideally permit the distance between the jaws to equal the outside dimension (d). At the top of the first jaw 105 is a first protrusion 120 that projects upward from the main body 102. Likewise, a second protrusion 125 is located at the top of the second jaw 110 and projects upward in the same manner as the first protrusion 120. The two protrusions are used, for example, when measuring an inner dimension of an object (not shown).

The digital caliper 100 further includes an encoder assembly 127 attached to the main body 102 of the caliper 100. As discussed in detail below, the encoder assembly 127 includes elements that translate the linear motion of the jaws into rotational motion and determine a distance between the jaws by measuring the rotational displacement of an encoder disk. At the front of the encoder assembly 127 is a digital display 130 that displays the numerical output of a measured dimension in the desired units. For example, in a preferred embodiment the digital display 130 is capable of displaying measurements in both millimeters and inches. Further, although several variations are possible, in a preferred embodiment the digital calipers 100 includes three buttons on the face of the encoder assembly 127 that correspond to different functions. In particular, when depressed the zero button 135 resets the digital display 130 to zero, the on/off button 140 turns the caliper 100 on and off and the units button 145 toggles between a choice of available units (e.g. millimeters and inches). Power for the caliper 100 is provided by a battery (not shown) contained within a battery case 150 located on the encoder assembly 127.

Figures 2A, 2B:
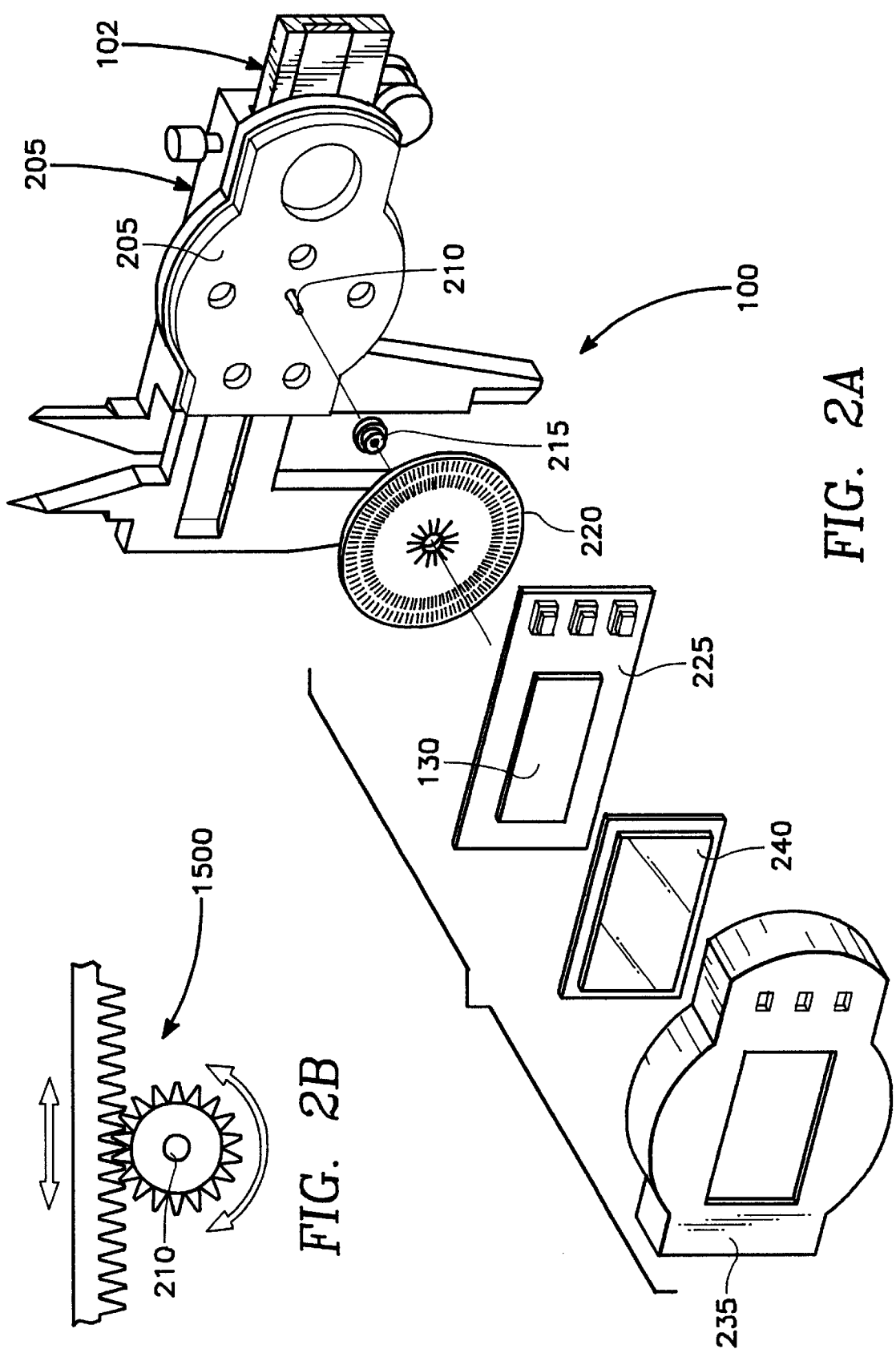
FIG. 2A shows an exploded view of an encoder assembly of the digital measuring system of FIG. 1.
FIG. 2B is a simplified depiction of a linear to rotational converter within the assembly of FIG. 2A

FIG. 2A shows an exploded view corresponding to FIG. 1. The encoder assembly 127 is positioned on a base 205 that is located on the main body 102 of the caliper 100. A shaft 210, which projects from the base 205, is attached to a linear-to-rotational converter 1500 (FIG. 2B) consisting of a series of conventional multiple-pass gears (not shown) that translate the linear motion of the jaws into rotational motion. In particular, as the jaws are opened and closed the shaft 210 rotates either counterclockwise or clockwise. Preferably, the multiple-pass gears have a conventional anti-backlash mechanism (such as a spring-loaded mechanism) that prevents backlash between the gears and provides more accurate measurements. In addition, the multiple-pass gears provide a way to amplify the linear movement of the jaws in relation to the rotation of the shaft 210. For example, a certain gear ratio may be provided such that for every millimeter that jaws are apart from each other the rotational displacement of the shaft is much greater than one millimeter, thus amplifying the linear movement of the jaws and providing greater resolution. These types of multiple-pass gears and anti-backlash mechanisms are known in the art and will not be discussed further. The linear-to-rotational converter may be any suitable type of measuring device capable of converting linear displacement into rotational displacement.

In a working example the caliper 100 is a dial caliper that has been converted into a digital caliper. The dial, which was previously attached to the shaft 210, was removed and the adapter 215 fastened onto the shaft 210. It should be noted that this particular caliper includes the type of linear-to-rotational converter described above and preferred for the present invention. The encoder disk 220 was fastened to the adapter 215 and the remainder of the encoder assembly positioned on the caliper base 205. Further, the cover 235 seals the unit from the outside environment and therefore protects the inside of the encoder assembly 127 from external contaminants. Thus, in the working example, a mechanical dial caliper was easily converted into a digital caliper having an encoder assembly protected from outside contaminants.

An adapter hub 215 is secured to the shaft 210 and facilitates the attachment of an encoder disk 220 to the shaft 210. A printed circuit board 225 containing the electronics and logic modules of the present invention are positioned over the encoder disk 220 and include the digital display 130. A cover 235 is located over the entire encoder assembly 127 so that the internal components of the encoder assembly 127 are sealed from the outside environment. A clear window 240 is positioned within the cover 235 for viewing the digital display 130, and forms part of the seal against the outside environment. The cover 235 and window 240 are securely fastened to seal the encoder assembly 127 from liquids, dust, dirt and other harmful contaminants that may interfere with the operation of the encoder assembly 127.

Figure 3:
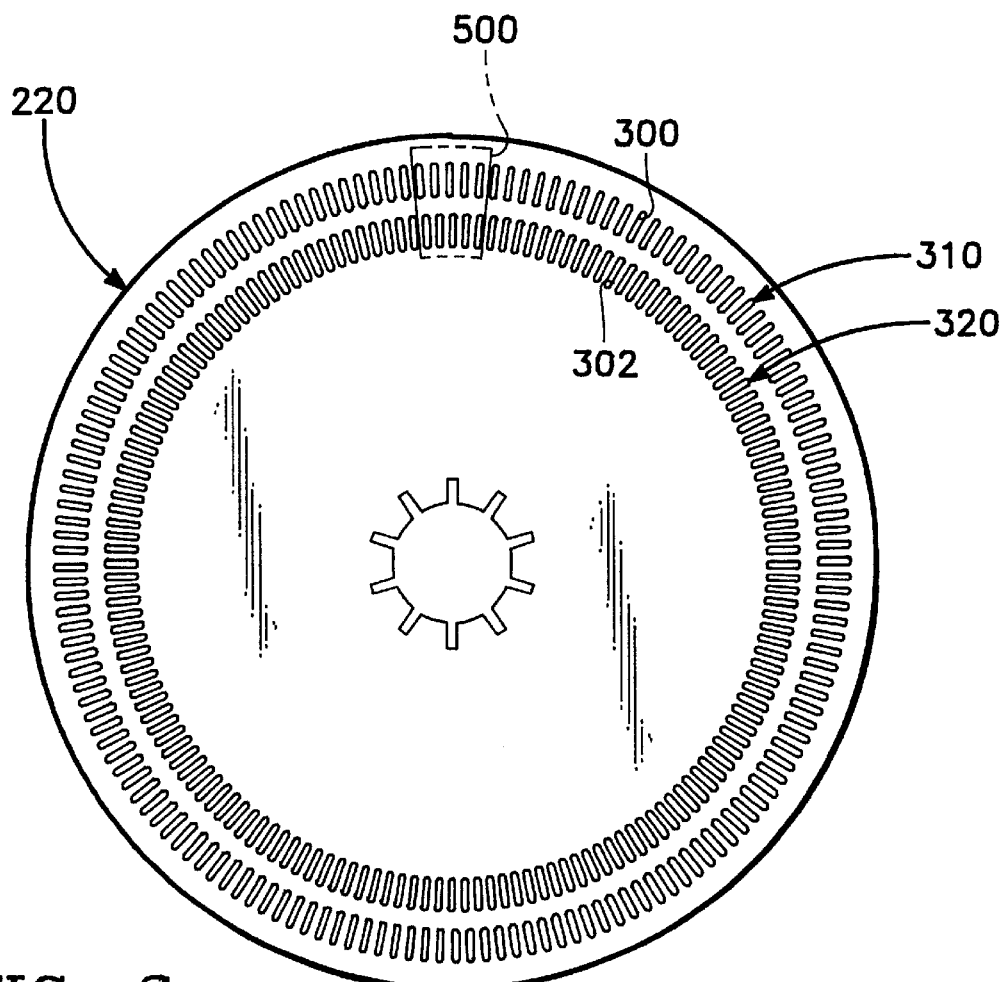
FIG. 3 shows a plan view of an encoder disk according to the present invention.

FIG. 3 shows a plan view of the encoder disk 220 according to the present invention. The encoder disk 220 is preferably chemically or photolithographically etched to provide concentric multiple rows of slots with the slots of each row being offset with each other. Other methods of etching the slots in the encoder disk may be utilized, as will be known by one skilled in the art. In a preferred embodiment shown in FIG. 3, the encoder disk 220 contains two rows of slots, which are apertures in the encoder disk 220. A first row of slots 310 is located near the circumference of the encoder disk 220 and the slots are uniformly spaced from one another. A second row of slots 320 is concentric with the first row 310 and has a smaller radius than the first row 310. As shown by the slots 300 and 302, the two rows are in quadrature with each other. In other words, the two rows are approximately ninety degrees out of phase with each other, meaning that a centerline of a slot in the first row 310 is circumferentially offset from a centerline of a slot in the second row 320 by one-quarter of the distance between slots. However, the slot offset need not be ninety degrees, and may be as little as ten degrees. In any case, the offset is skewed so that each slot in one row is closer to a slot in the other row than to other slots. Thus, the signals from the two rows 310 and 320 appear as slightly offset pairs of signal peaks. In a working example, the encoder disk has two rows, the diameter of the encoder disk 220 is 1.1 inches and each row contains 250 slots.

Figure 4:
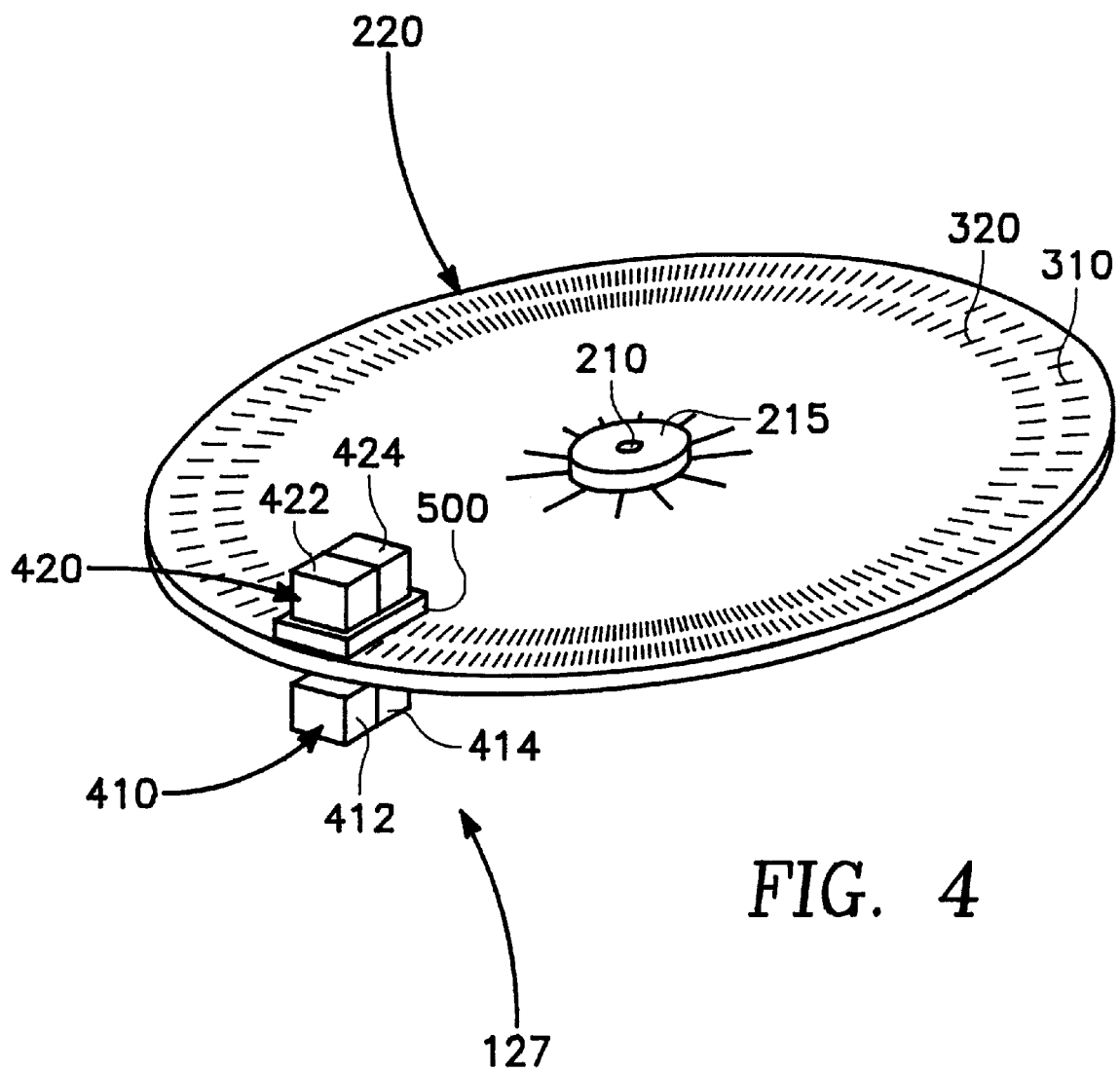
FIG. 4 illustrates the encoder disk, a radiation source and a radiation detector of the encoder assembly shown in FIG. 2.

FIG. 4 illustrates the configuration of the encoder disk 220, a radiation source and a radiation detector of the encoder assembly 127 shown in FIG. 2. The encoder disk 220 is positioned on the shaft 210 using the adapter 215. A radiation source 410 is located on one side of the encoder disk 220 and situated so that radiation from the radiation source can pass through some of the slots in each row. In general the radiation source 410 may be located on either side of the encoder disk 220. Preferably, as shown in FIG. 4, there is an outer radiation source 412 and an inner radiation source 414 for each row of slots although a single radiation source or more than one radiation source per row may be used. In addition, the radiation source 410 is preferably an infrared source although other types of radiation such as, for example, visible light, may be used.

In an alternative embodiment, non-optical radiation sources and sensing devices, or their equivalent may be utilized. These include, by way of example and not limitation, magnets, capacitive plates, inductive coils, electrical current measurements, voltage measurements, and resistance measurements. In addition, MEMs (microelectictro-mechanical) switches and systems may be utilized to carry out the present invention, as well as nano scale sensors and devices. Further, the radiation source and/or sensor need not be separate from the encoder disk. By way of example, a radiation source could be mounted upon the encoder disk, while the sensor is a unit separate form the encoder disk. Conversely, a sensor could be mounted upon the encoder disk, while the radiation source is a unit separate from the encoder disk. In these alternate embodiments, the apertures in the encoder disk may not be necessary, as either the radiation source or detector is mounted directly upon the encoder disk and may rotationally pass either the detector or radiation source respectively.

Figure 5:
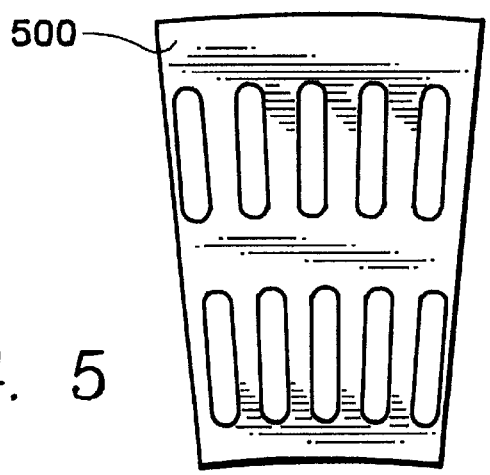
FIG. 5 illustrates a plan view of a stationary aperture according to the present invention.

On the other side of the encoder disk 220 and directly opposite the radiation source 410 is a radiation detector 420. The radiation detector 420 is positioned such that the encoder disk 220 lies between the detector 420 and the radiation source 410 and is capable of detecting radiation from the radiation source 410. In a preferred embodiment, there are two radiation detectors, an outer radiation detector 422 and an inner radiation detector 424. Referring to FIGS. 4 and 5, in a preferred embodiment a stationary aperture 500 is fixed between the encoder disk 220 and the radiation detector 420 and is aligned with the rows of slots in the encoder disk 220. In particular, the stationary aperture 500 includes the same number of rows as the encoder disk 220 with each row having a plurality of slots. The slots of the stationary aperture 500 approximately line up with the slots of the encoder disk 220, and serve to collimate the radiation from the emitter. As shown by the dotted lines in FIG. 3, the stationary aperture 500 is essentially a small portion of encoder disk 220. In a preferred embodiment, the slots in the stationary aperture 500 are smaller than the slots in the encoder disk 220. In a working example the number of slots in each row of the stationary aperture 500 is five slots.

Figure 6:
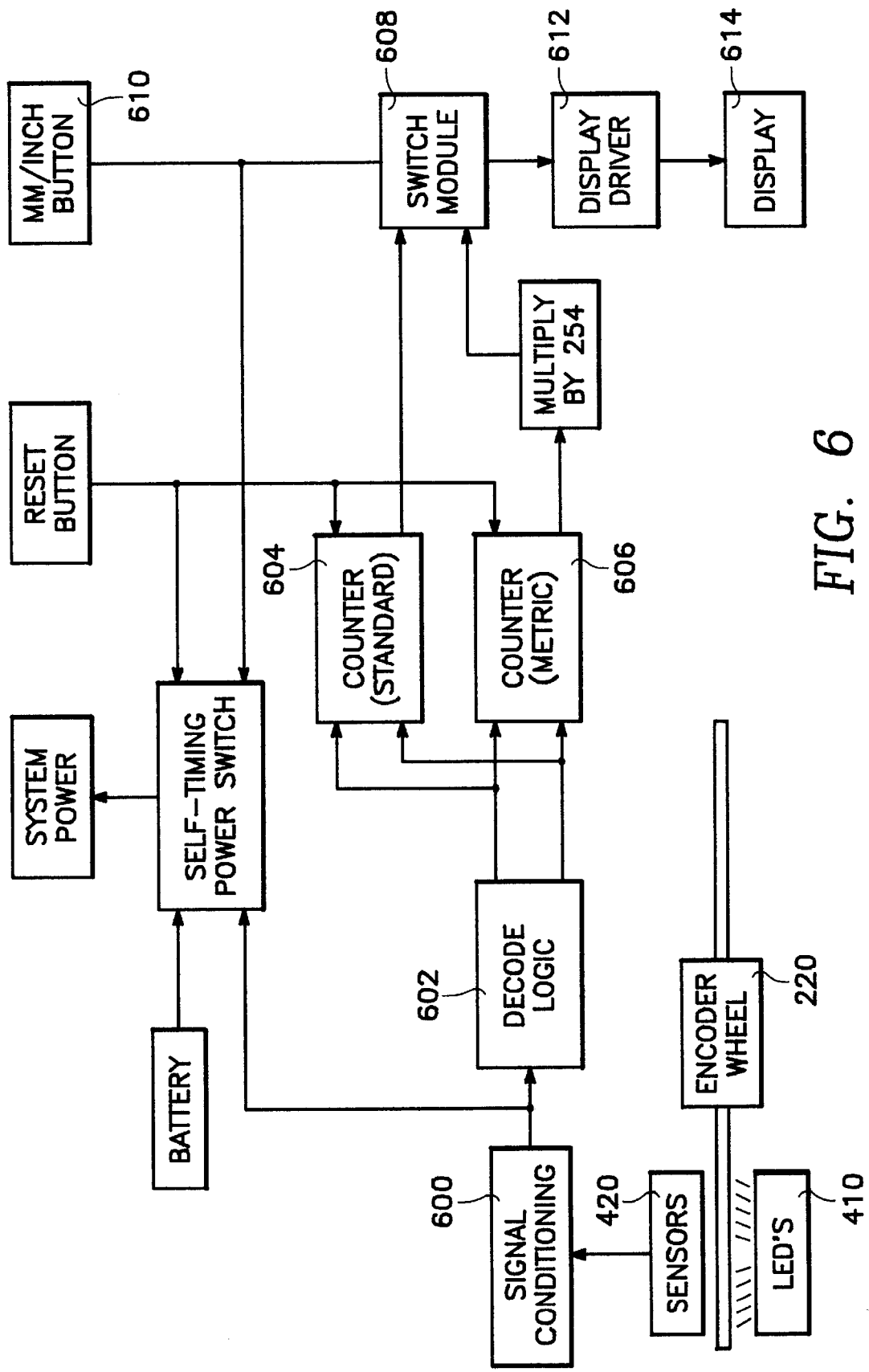
FIG. 6 is block diagram of the signal processing modules of the present invention.

A block diagram of a signal processing module is depicted in FIG. 6. As discussed above, as the open slots in the encoder disk 220 rotate over the radiation source 410, radiation is detected by the sensors 420. Hereinafter, a set consisting of a radiation source and sensor, with its corresponding row of slots, will be referred to as a "channel". Thus, there are two channels, one for each row of slots in the encoder disk 220. When radiation from the source is detected, the sensors 420 emit a pseudo-sinusoidal signal corresponding to the strength of the detected source radiation. The signal from the sensor 420 is transmitted to a signal conditioner 600. Each channel has its own conditioner 600.

The signal conditioner 600 is of the conventional type which receives a signal from a sensor 420, and removes background noise and other anomalies using techniques well known in the art. The conditioned signal is then received by the decode logic module 602, the operation of which will be discussed in detail below.

In general, the decode logic module 602 utilizes the conditioned analog signals from signal conditioners 600 associated with each channel to determine when to send a digital pulse to a counter 604 or 606, and to determine the rotational direction of the encoder disk 220. Rotational direction of the encoder disk 220 determines whether the pulse sent to a counter 604 or 606 increments or decrements the measuring count. Further, as discussed in detail below, the decode logic module 602 also performs error detection and jitter compensation.

Once a counter 604 or 606 has been incremented/ decremented, the resulting counter value is sent to a switch module 608. The switch module 608 determines the value from counter 604, representing English units, or 608, representing SI units, to be displayed to a user.

By depressing the mm/inch button 610, the user determines what types of units will be displayed. The switch module 608 then transfers the value stored in counter 604 or 608 respectively, to the LCD Driver module 612. The LCD Driver module 612 converts the received value into signals which will allow the LCD Display 614 to display the corresponding value to a user. Implementation of the counter 604 or 606, switch module 608, mm/inch button 610, LCD Driver 612 and LCD Display 614 are well known in the art.

Figure 7:
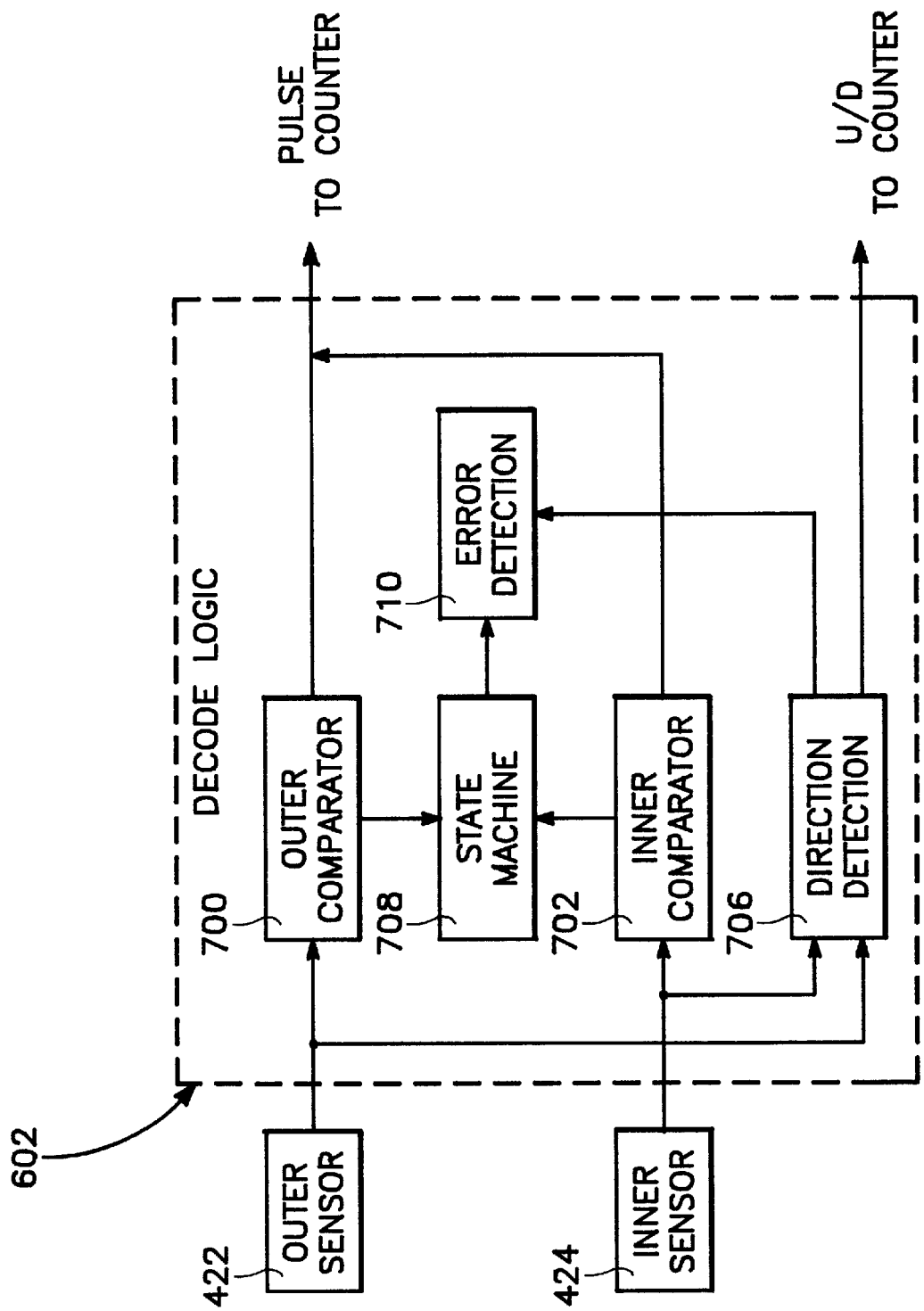
FIG. 7 is a block diagram of the decode logic module 602 of FIG. 6

FIG. 7 is a block diagram of the decode logic module 602. The operational details are discussed below, in the Functional Overview section. As mentioned earlier, the there are two channels from which signals are received. One channel corresponds with signals generated by the outer slot ring (hereinafter "outer slot channel") while the other channel corresponds with the inner slot ring (hereinafter "inner slot channel"). The signal generated by the outer slot channel is received by an outer comparator 700, while the signal generated by the inner slot channel is received by an inner comparator 702. The comparator 700 or 702, samples the received signal level and compares a sampled signal to signal threshold levels. The comparator function may be realized in dedicated logic circuitry or in a programmed microprocessor.

Figure 8:
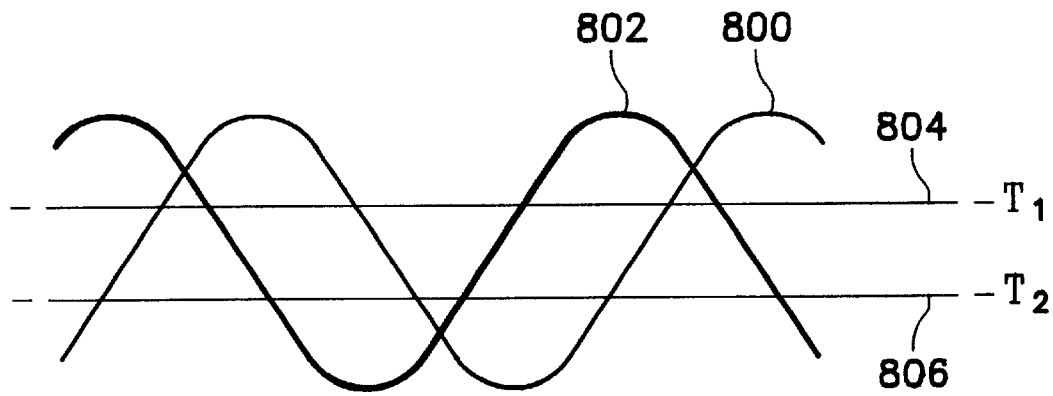
FIG. 8 shows a waveform pattern for the present invention and relative high and low threshold levels.

Referring to FIG. 8, when a signal 800 or 802 generated by a sensor 420, exceeds a high threshold 804, the signal is considered by the comparator 700 or 702, respectively, to be high. When a signal exceeds a low threshold 806, the signal is considered by the comparator 700 or 702, respectively, to be low. However, the comparator indicates a change from high to low only when the signal crosses the low threshold 806, and indicates a change from low to high only when a high threshold 804 is crossed. The comparator thus generates "high" and "low" pulses. This manner of changing states allows the system to compensate for signal jitter, as will be discussed in detail below.

When a signal 800 or 802 goes high or low, a pulse is sent to the counter 604 or 606, respectively, of FIG. 6. Additionally, when a signal 800 or 802 goes low, a pulse is sent to a counter 604 or 606.

A pulse sent to a counter 604 or 606 can either increment or decrement the value of the counter 604 or 606. Whether the count is incremented or decremented is determined by the direction of rotation of the encoder disk 220. Referring again to FIG. 7, the direction detection module 706 receives signals directly from the signal conditioners 600, one from the outer channel and one from the inner channel. The sequence of relatively high and low signals from each channel is used to determine rotational direction of the encoder disk 220, utilizing the quadrature offset of the slots to offset signals generated by rotation of the disk in time. By way of example, if the slot pattern in FIG. 3 shown by an outer slot 300 and an inner slot 302 were utilized, the direction detection module receives a high signal from the inner encoder row 320 followed by a high signal from the outer encoder row 310 of FIG. 3, the encoder disk 220 is rotating in a clockwise direction. Determination of direction of rotation of the encoder disk 220 is discussed in detail below. Once the direction of rotation of the encoder disk 220 is determined, an up/down signal is sent to a counter 604 or 606. This up/down signal will set the counter 604 or 606 to either increment or decrement when a counting pulse is received by a counter 604 or 606 from a comparator 700 or 702.

As the openings of the encoder wheel 220 and aperture 500 come into registration, radiation passes to the sensor 420. When the openings in the encoder wheel 220 and aperture 500 are not in registration, radiation is prevented from passing to the sensor 420. As the encoder wheel 220 rotates, the positions of the radiation source 410 and sensor 420 pairs enter different states. These states are defined by positions constituting a complete exposure, or complete lack of exposure, of the radiation source 410 by the encoder disk 220. As can be seen by one skilled in the art, there are a minimum of four distinct states, given that there are two channels, the slots of which are in quadrature with each other. The present invention utilizes these states to detect errors and compensate for signal jitter, and, preferably, to determine rotational direction of the encoder disk 220. In order to monitor and store these states, the present invention utilizes a state machine 708, shown in FIG. 7.

The decode logic 602 of FIG. 6 contains the state machine 708 of FIG. 7. The state machine 708 receives the high and low pulses from each comparator 700, and 702, and uses these pulses to set the state of the system. Preferably, this state is represented by a two-bit state value. When a comparator 700 or 702 receives a high signal as defined above, the state machine 708 receives a high or "1" pulse from that comparator. Conversely, when a comparator 700 or 702 has received a low signal as defined above, the state machine 708 receives a low or "0" pulse from that comparator. The state machine 708 concatenates the signals, or bits, received from each comparator 700 and 702 to construct the two-bit state value. In a preferred embodiment, the signal received from the outer comparator 700 occupies the first position in the two bit state value, while the signal received from the inner comparator 702 occupies the second position in the two bit state value. The state machine 708 is discussed directly below and in detail in the Functional Overview section.

As the encoder disk 220 rotates and passes by an emitter 410, a sensor 420 receives radiation from the emitter 410 and generates a signal. The signal generated by the sensor 420 is received by the signal conditioner 600 and then by a comparator 700 or 702. The signal received by each comparator will appear generally sinusoidal as shown in FIG. 8. The relative peaks and valleys in the sinusoidal waveform correspond with the positions of the emitter 410 as detected by a sensor 420, relative to a slot in the encoder disk 220.

Figure 9:
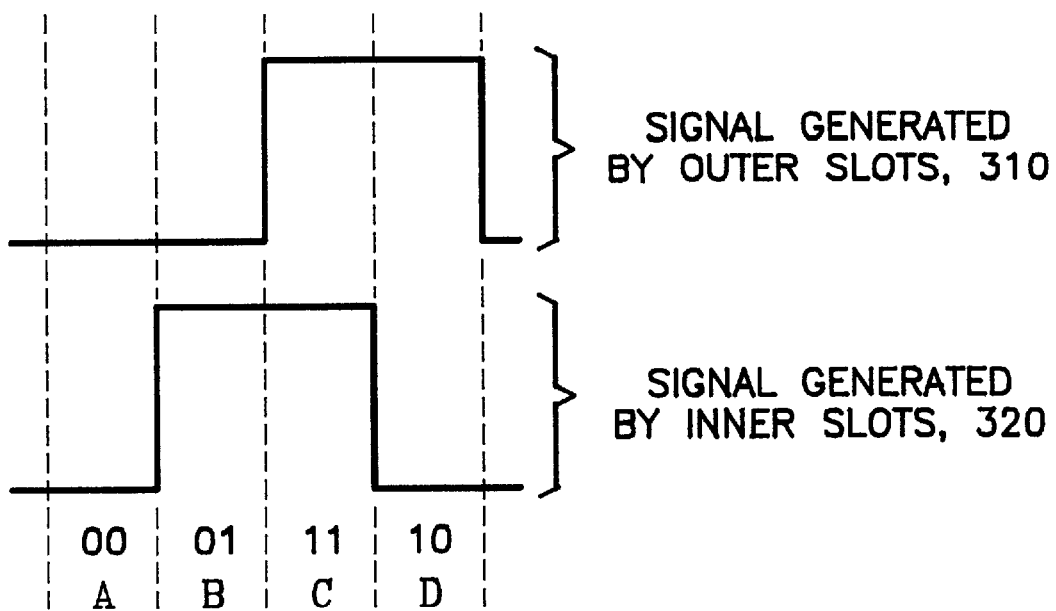
FIG. 9 shows a time domain waveform of signals generated as the encoder disk rotates between emitter/sensor pairs.

FIG. 9 shows the digital time domain waveforms generated by the outer ring 310 and inner ring 320 of slots of the encoder wheel 220 of FIG. 3, as they rotatably pass between a stationary emitter 410 (outer emitter 412, an inner emitter 414) and a stationary sensor pair 420 (outer sensor 422, inner sensor 424), seen in FIG. 4. The dashed vertical lines of FIG. 9 delineate different segments of the signals generated. The segment labeled "A" corresponds to a state in which a solid portion of the outer slot ring 310 and inner slot ring 320 block the transmission of radiation from the outer emitter 412 and inner emitter 414 to the sensors 422 and 424. The segment labeled "B" corresponds to a state in which a solid portion of the outer slot ring 310 blocks the transmission of radiation from the outer emitter 412 to the outer sensor 422, while an aperture of the inner slot ring 320 allows transmission of radiation from the inner emitter 414 to the inner sensor 424. The segment labeled "C" corresponds to a state in which an aperture of the outer slot ring 310 and inner slot ring 320 allow transmission of radiation. The segment labeled "D" corresponds to a state in which an aperture of the outer slot ring 310 allows transmission of radiation, while a solid portion of the inner slot ring 320 inhibits transmission of radiation.

Referring to FIGS. 9 and 7, when both emitters 412 and 414 are underneath a solid (non-slotted) portion of the encoder disk 220, each comparator 700 and 702 receives a low signal from each sensor 422 and 424, shown in FIG. 4, and each comparator 700 and 702 sends a low, or 0, signal to the state machine 708. This corresponds with signal segment "A" of FIG. 9. At this point the state machine 708 would contain a state represented by the two bit value 00.

With the encoder disk 220 moving in a clockwise direction while the emitters 412 and 414 remain stationary, the next position corresponds to signal segment "B" of FIG. 9 when the outer emitter 412 is beneath a solid portion of the encoder disk 220 while the inner emitter 414 is beneath a slot. The outer comparator 700 receives a low signal from the outer sensor 422, and sends a low, or 0, signal to the state machine 708. The inner comparator 702 receives a high signal from the inner sensor 424, and sends a high, or 1, signal to the state machine. At this point the state machine 708 would contain a state represented by the two bit value 01.

As the encoder disk moves further in a clockwise direction, the next position corresponds to signal element "C" of FIG. 9 when the outer emitter 412 is beneath a slot of the encoder disk 220, with the inner emitter 414 also beneath a slot. The outer comparator 700 receives a high signal from the outer sensor 422, and sends a high, or 1, signal to the state machine 708. The inner comparator 702 also receives a high signal from the inner sensor 424, and sends a high, or 1, signal to the state machine 708. At this point the state machine 708 would contain a state represented by the two-bit value 11.

As the encoder disk moves yet further in a clockwise direction, the next position corresponds to signal element "D" of FIG. 9 when the outer emitter 412 is beneath a slot of the encoder disk 220, with the inner emitter 414 beneath an un-slotted solid portion. The outer comparator 700 receives a high signal from the outer sensor 422, and sends a high, or 1, signal to the state machine 708. The inner comparator 702 receives a low signal from the inner sensor 424, and sends a low, or 0, signal to the state machine 708. At this point the state machine 708 would contain a state represented by the two-bit value 10.

III. Functional Overview

Encoder Assembly

Referring to FIGS. 3–5, a rotational displacement of the encoder disk 220 is determined using the radiation source 410 and the radiation detector 420. In particular, the radiation source 410 emits radiation toward the slots of the encoder disk 220 and this radiation is detected by the radiation detector 420 on the other side of the disk and opposite the radiation source 410. As the encoder disk 220 rotates, the radiation sensed by the radiation detector 420 varies in a sinusoidal manner. For example, as a slot becomes aligned with the detector 420 the signal intensity is approximately at its maximum and as the solid portion between the slots becomes aligned with the detector 420 the signal intensity is approximately at its minimum.

In a preferred embodiment, the stationary aperture 500 is positioned between the encoder disk 220 and the radiation detector 420. Preferably, the stationary aperture 500 has two rows with five slots per row, and has a slot size slightly smaller than that of the slots in the encoder disk 220. The stationary aperture 500 serves to further restrict the flow of radiation from the source 410 to the sensor 420. The causes a sensor 420 to receive a strong signal from the radiation source 410 only when the slot in the stationary aperture 500 and encoder disk 220 are very closely aligned. This benefits the system as a whole in that the sensor 420 will emit more definite high and low signals to the signal processor. An "open" condition is defined as when the slots of the encoder disk 220 are lined up with the slots of the stationary aperture 500 and radiation from the radiation source 410 passes through the aligned slots. Conversely, a "closed" condition is defined as when the slots of the encoder disk 220 are lined up with the solid portion between the slots of the stationary aperture 500. Ideally, during this closed condition very little radiation can pass through the encoder disk/stationary aperture combination.

Signal Processing Module

The structural overview of the Signal Processing module has been discussed above with regards to FIG. 6. The present discussion will primarily concern the Decode Logic module 602 within the Signal Processing Module. The physical structure of the Decode Logic module has been discussed above and is graphically set forth in FIG. 7. This discussion will concern the functioning of the various components of the Decode Logic module 602 as they interact with the measuring system of the present invention.

As discussed above, the Decode Logic module 602 preferably contains two comparators, an outer comparator 700, which compares a signal from the outer channel, and an inner comparator 702, which compares a signal from the inner channel.

Figure 10:
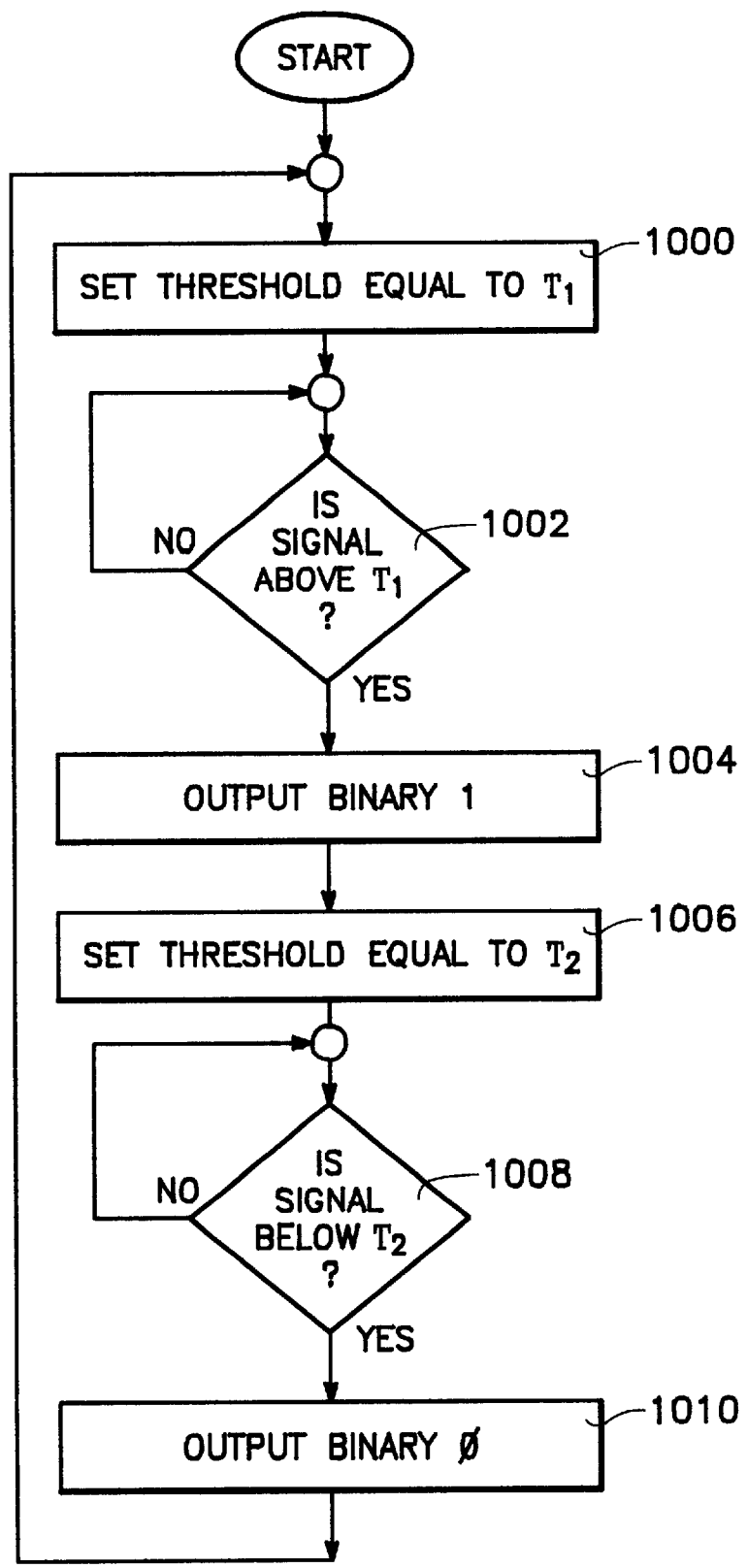
FIG. 10 shows a flow diagram of the operation of a comparator in the present invention.

The following discussion of FIG. 10 will concern only a single comparator. It should be noted that this discussion will be equally applicable to both the outer comparator 700 and inner comparator 702 of the preferred embodiment. In Block 1000 a signal threshold $T_1$ is set to a preset level. (For purposes of this discussion, the preset level $T_1$ is a level above which the signal to the comparator is considered high as discussed above, corresponding to the a high threshold 804, of FIG. 8. $T_2$ is the level below which the signal to the comparator is considered to be low as discussed above, corresponding to the low threshold 806, of FIG. 8.) In Block 1002, the comparator determines if the signal received from appropriate sensor is above $T_1$. If the received signal is not above $T_1$ (NO branch of Block 1002), the comparator continues to monitor the signal. If the received signal is above $T_1$ (YES branch of Block 1002), the comparator outputs a binary 1, or high signal (Block 1004). The signal threshold of interest is then changed from $T_1$ to $T_2$ in Block 1006. In Block 1008, the comparator determines if the signal level received from the sensors is below $T_2$. If the signal is not below $T_2$ (NO branch of Block 1008), the comparator continues to monitor the signal. If the received signal is below $T_2$ (YES branch of Block 1008), the comparator outputs a binary 0, or low signal (Block 1010).

In accordance with the above discussion, it should be noted that the output of a comparator remains high until a low threshold is crossed, and once the low threshold has been crossed, the comparator output remains low until a high threshold is crossed.

In a preferred embodiment, there is only a single signal threshold to be compared with the signal. This threshold changes from a high to a low threshold, or low to high, once a particular threshold has been crossed. That is, once a high threshold has been crossed, the threshold to be compared with the signal changes to a low threshold. Once a low threshold has been crossed, the threshold to be compared with the signal changes to a high threshold.

The signal states (1 and 0, high and low) output by a comparator as mentioned above are utilized (as will be described) in incrementing/decrementing a counter 604 or 606, updating the emitter state in the state machine 708, and error detection.

With regard to incrementing/decrementing the counter 604 or 606, when the output of a comparator is either high or low, the comparator outputs a single pulse to a counter. The pulse will either increment or decrement the counter, depending upon the current direction of rotation of the encoder disk 220. Determination of direction of rotation is discussed below.

Direction is determined by observing the signals from the signal conditioner of FIG. 7. The preferred method of direction determination depends upon the offset of the slot rows in the encoder wheel. Using the slot offset pattern of FIG. 3 shown by an outer slot 300 and an inner slot 302 as an example, if the wheel is rotating in a clockwise direction, the Direction Determination module 706 of FIG. 7 will detect a high signal from the channel associated with the inner slot ring 320, followed by a high signal from the channel associated with the outer slot ring 310. If the encoder disk 220 is rotating in a counter clockwise direction, a high signal will be detected on the channel associated with the outer slot ring, followed by a high signal on the channel associated with the inner slot ring. (An alternative method of determining rotational direction is to deduce the direction from the sequence of states within the state machine 708.) Once direction of rotation of the encoder disk 220 is determined, a signal is sent by the Direction Detection Module 706 to the counter 604 or 606 to use incoming pulses from the comparator 700 or 702 to increment or decrement the measuring count.

Figure 11:
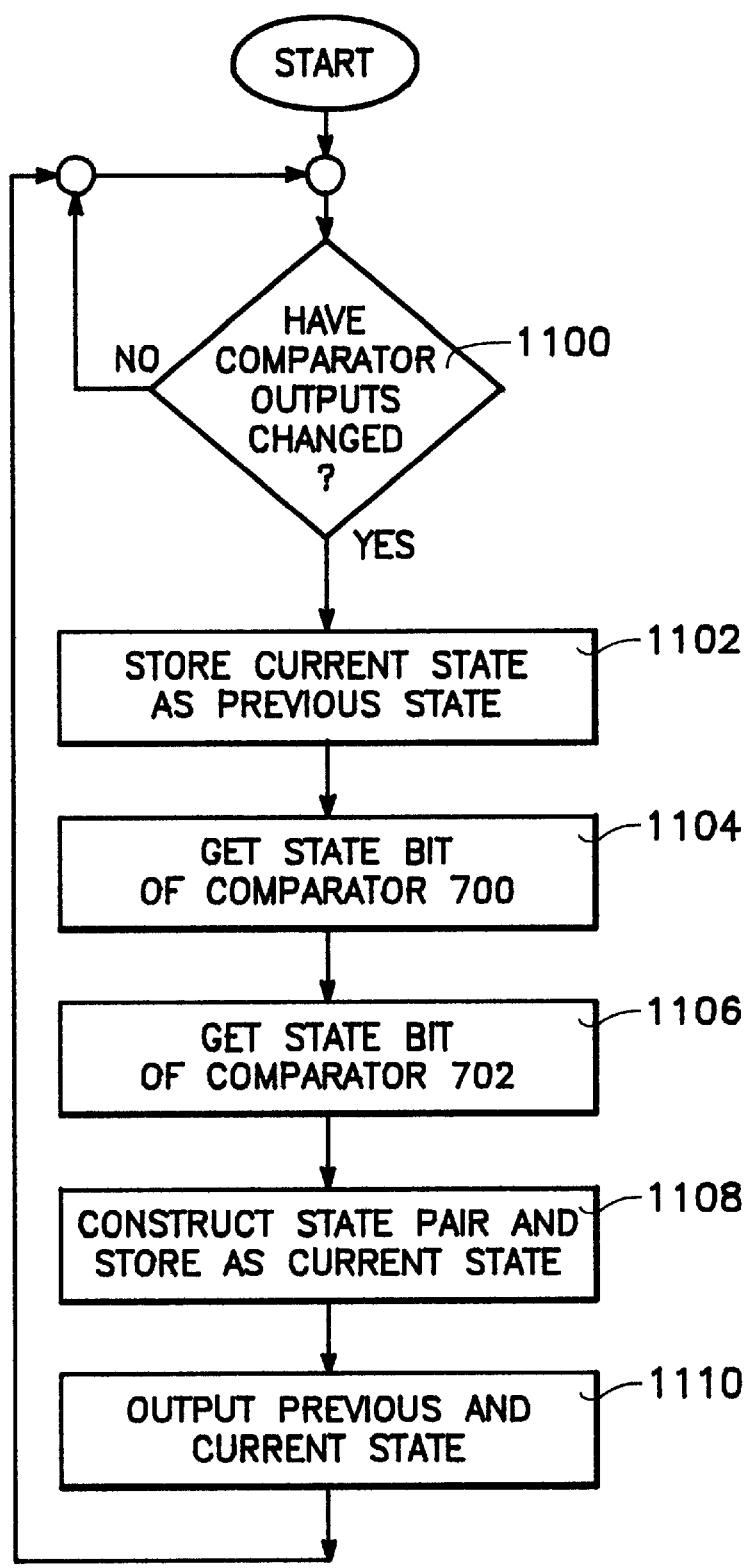
FIG. 11 shows a flow diagram of the operation of a state machine in the present invention.

Referring to FIG. 11, the state machine 708 (FIG. 7) determines if the outputs of the comparators 700 and/or 702 have changed (Block 1100 of FIG. 11). If the outputs of the comparators 700 and/or 702 have not changed (NO branch of Block 1100) the state machine 708 will continue to monitor the outputs of the comparators 700 and 702. If the output of one of the comparators has changed (YES branch of Block 1100) the state machine 708 will store the current state as the previous state (Block 1102). Next, the state machine will get the state bit from the outer comparator 700 (Block 1104). The state machine will then get the state bit from the inner comparator 702 (Block 1106). The state machine then concatenates the state bits generated by the outer 700 and inner 702 comparators to form a two-bit state and set this value to be the current state (Block 1108). The state machine 708 then outputs the previous state and current state (Block 1110).

Figure 12:
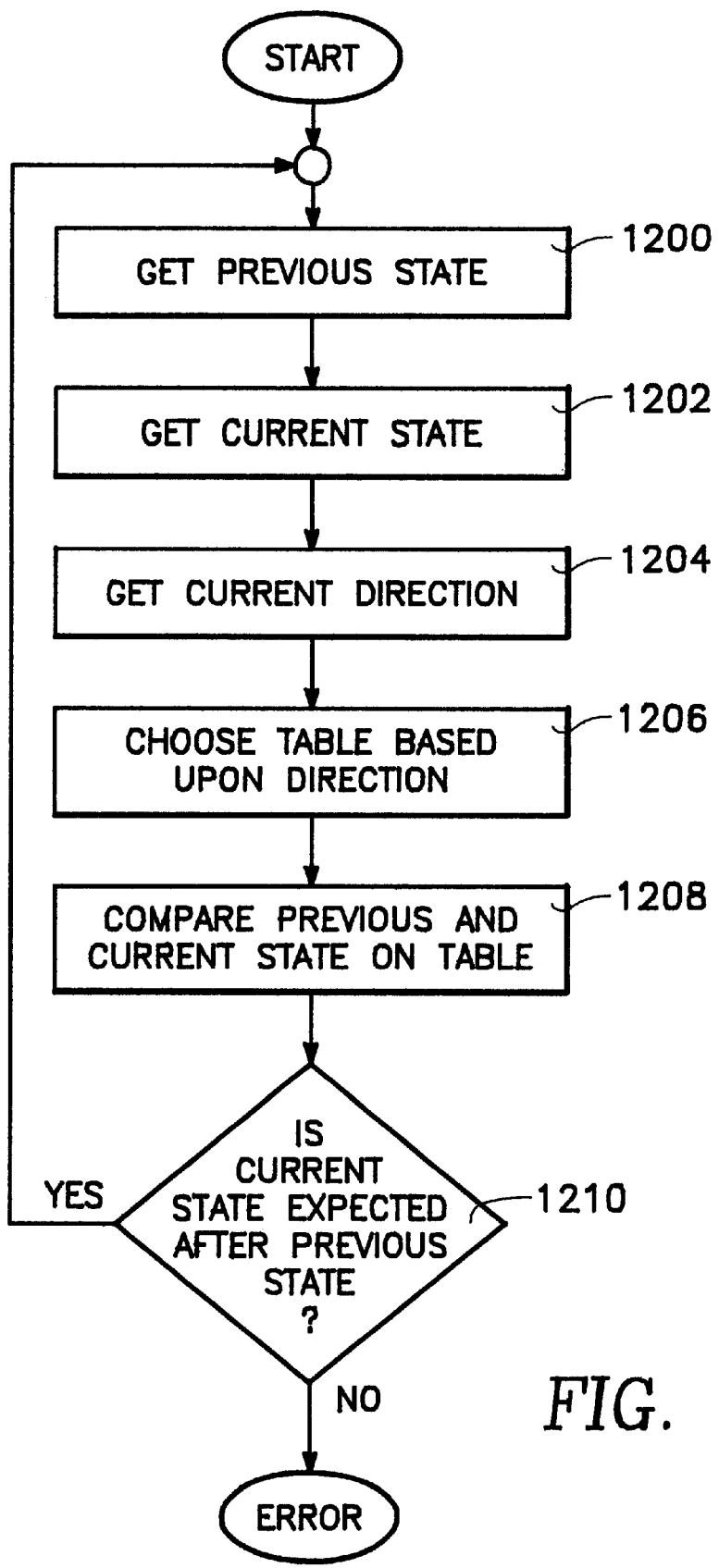
FIG. 12 shows a flow diagram of the operation of error detection in the present invention.

The output from the state machine 708 is used by the error detection module 710 of FIG. 7 to determine if an error in counting has occurred. As discussed previously, an error can occur if the jaws of the measuring device are opened too quickly. Referring to FIG. 12, the error detection module 710 gets the value of the previous state from the state machine 708 (Block 1200). Next, the error detection module 710 retrieves the current state from the state machine 708 (Block 1202). The error detection module next retrieves the direction of rotation information from the Direction Detection module 706 (Block 1204). Based upon the direction of travel of the encoder disk 220, the error correction module 710 logic accesses a table which compares the previous state to the current state, and determines if the current state is expected after the previous state (block 1206). When determining if an error has occurred while traveling in the clockwise direction, the table in FIG. 13 is used, while the table in FIG. 14 is used when the encoder disk 220 is traveling in a counter-clockwise direction. The states depicted in each of these tables corresponds with the depiction of signal segments set forth in FIG. 9. Based upon the table entries, the previous state and the current state are compared in Block 1208 of FIG. 12. In Block 1210, based upon the table entries, it is determined whether or not the current state is expected after the previous state. If the current state is expected after the previous state (YES branch of Block 1210), the error detection module continues to analyze the next state. If the current state is not expected after the previous state (NO branch of Block 1210), an error has occurred. In a preferred embodiment, upon occurrence of an error, a message is displayed to the user, requiring the user to close the jaws of the calipers and re-zero the system.

If the alternative method of direction determination is used, i.e. by deducing direction from the sequence of states, then the tables of FIGS. 13 and 14 determine the state sequence for the clockwise or counterclockwise directions, respectively.

The addition of the error detection system as set forth above removes the need for a mechanical motion dampening system. If the user opens, or closes, the jaws too quickly, causing an error to occur, an error message is displayed to the user requiring him to close the jaws of the device and re-zero the system. As a motion dampener is not required, a measuring device utilizing the present invention will cost substantially less and have less mechanical complexity than a unit requiring a motion dampener.

The present invention further obviates the need for motion dampening systems and other hardware by compensating for signal jitter though the inherent operation of the comparators 700 and 702 in the preferred embodiment. As discussed above, in order for a signal to go from high to low, the signal must first cross the low threshold. By way of example, if a signal were to jitter about the high threshold, the comparator would continue to construe the signal as high until the low threshold was actually crossed. Preferably, the high and low thresholds are far enough apart such that both cannot be crossed when signal jitter occurs Returning to the example of a signal jittering about the high threshold, the only way for a signal to go from a high state to a low state would be for a valid signal to be generated due to rotation of the encoder disk. Signal jitter alone cannot trigger a change in states or thresholds. By setting the high and low thresholds significantly far apart (e.g. 25% or more of the peak signal excursion), and by not changing signal states until the next threshold is crossed, the effects of jitter upon the system are minimized or eliminated.

The decode logic 602, or its individual components, may be implemented as dedicated logic circuitry or a programmed microprocessor, for example.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A portable hand held linear distance measurement apparatus having a slide which is hand movable relative to a caliper body and an encoder wheel linked to linear motion of the slide, said apparatus comprising:

a pair of respective concentric circular rows of plural spaced slots in said encoder wheel, said pair of rows being radially offset from one another, the slots in one row being circumferentially offset from the slots in the other row;

a sensor associated with each of said rows capable of generating a signal which is a function of alignment between the sensor and successive ones of the slots in the respective row as the wheel rotates, whereby to generate one signal for each of said rows, wherein said apparatus has a pair of sensors corresponding to said pair of rows;

a signal processor for combining the signals generated for each of said rows and generating therefrom a count indicative of a distance measurement, whereby said count provides a distance resolution exceeding that obtainable from a single one of the signals generated for a single one of the rows of slots;

a human-readable visual display on said body, said display being controlled by said signal processor to display said distance measurement;

wherein said signal processor comprises a comparator connected to receive the signal corresponding to a respective one of said rows of slots, each said comparator comprising:

a pulse-generating circuit for generating a first pulse whenever said signal exceeds a first predetermined threshold and generating a second pulse after said first pulse whenever said signal falls below a second predetermined threshold;

a state machine for forming a two-element state from the concurrent outputs of said pair of comparators, whereby a sequence of different two-element states occurs upon rotation of said encoder wheels; and an error detection module for forming a sequence of successive ones of said two-element states and determining whether said sequence is a valid sequence, whereby to generate an error message on said display whenever an invalid sequence is detected.

2. A portable hand held linear distance measurement apparatus having a slide which is hand movable relative to a caliper body and an encoder wheel linked to linear motion of the slide, said apparatus comprising:

a pair of respective concentric circular rows of plural spaced slots in said encoder wheel, said pair of rows being radially offset from one another, the slots in one row being circumferentially offset from the slots in the other row;

a sensor associated with each of said rows capable of generating a signal which is a function of alignment between the sensor and successive ones of the slots in the respective row as the wheel rotates, whereby to generate one signal for each of said rows, wherein said apparatus has a pair of sensors corresponding to said pair of rows;

a signal processor for combining the signals generated for each of said rows and generating therefrom a count indicative of a distance measurement, whereby said count provides a distance resolution exceeding that obtainable from a single one of the signals generated from a single one of the rows of slots;

a human-readable visual display on said body, said display being controlled by said signal processor to display said distance measurement; and wherein said signal processing module further comprises:

a state machine capable of storing a state of the encoder wheel, wherein said state is determined by the signals generated by said sensors.

3. The hand held digital measuring device of claim 2 wherein said state comprises a vector comprised of signals received from said sensors, wherein respective elements of the vector are comprised of respective ones of said signals generated by said sensors.

4. The hand held digital measuring device of claim 2 further comprising an error detection module wherein said error detection module detects errors by a means for comparing a present state with a previous state, and a means for determining if the present state is expected after the previous state; and a means for displaying an error message in human readable form on said display.

* * * * *